United States Patent
Huang et al.

(10) Patent No.: US 9,149,986 B2
(45) Date of Patent: Oct. 6, 2015

(54) THREE-DIMENSIONAL PRINTING APPARATUS

(71) Applicants: XYZprinting, Inc., New Taipei (TW); Kinpo Electronics, Inc., New Taipei (TW); Cal-Comp Electronics & Communications Company Limited, New Taipei (TW)

(72) Inventors: Chen-Fu Huang, New Taipei (TW); An-Hsiu Lee, New Taipei (TW)

(73) Assignees: XYZprinting, Inc., New Taipei (TW); Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 51 days.

(21) Appl. No.: 14/250,365

(22) Filed: Apr. 10, 2014

(65) Prior Publication Data

US 2015/0158248 A1 Jun. 11, 2015

(30) Foreign Application Priority Data

Dec. 11, 2013 (TW) .............................. 102145607 A

(51) Int. Cl.
*B29C 67/00* (2006.01)
*B33Y 30/00* (2015.01)
*B33Y 10/00* (2015.01)

(52) U.S. Cl.
CPC ........... *B29C 67/0085* (2013.01); *B29C 67/007* (2013.01); *B33Y 10/00* (2014.12); *B33Y 30/00* (2014.12)

(58) Field of Classification Search
CPC ............ B29C 67/0088; B29C 67/0066; B29C 67/0092; B29C 35/08; B29C 39/42; B44C 1/04; B44C 1/00; C08F 2/46; C08F 2/48; C08F 2/00
USPC ....................................................... 425/161
See application file for complete search history.

(56) References Cited

U.S. PATENT DOCUMENTS

2015/0056320 A1* 2/2015 Costabeber ................... 425/169

* cited by examiner

*Primary Examiner* — Jacob Thomas Minskey
(74) *Attorney, Agent, or Firm* — Jianq Chyun IP Office

(57) ABSTRACT

A three-dimensional printing apparatus including a chassis, a tank, an outer cover and a shielding module is provided. The tank is disposed at the chassis and adapted to be filled with a liquid forming material. The outer cover is pivoted on the chassis. The shielding module includes a pivot and a mask. The pivot is disposed on the chassis and beside the tank. The mask is winding on the pivot and connected with the outer cover. When the outer cover rotates to a first position and covers the tank, the mask is winding on the pivot. When the outer cover rotates to a second and exposes the tank, the outer cover pulls the mask out of the pivot, so that the mask covers the tank in order to shield the liquid forming material filled in the tank.

10 Claims, 5 Drawing Sheets

THREE-DIMENSIONAL PRINTING APPARATUS

CROSS-REFERENCE TO RELATED APPLICATION

This application claims the priority benefit of Taiwan application serial no. 102145607, filed on Dec. 11, 2013. The entirety of the above-mentioned patent application is hereby incorporated by reference herein and made a part of this specification.

BACKGROUND

1. Field of the Disclosure

The disclosure relates to a printing apparatus. More particularly, the disclosure relates to a three-dimensional printing apparatus.

2. Description of Related Art

There are many different technologies currently used to build physical three-dimensional (3-D) models using additive manufacturing technology, for example, building a model layer by layer. Typically, a virtual design of the 3-D model using additive manufacturing technology, for example, represented through computer-aided design (CAD) software or the like, is transformed into a plurality of thin (quasi-two-dimensional) cross-sectional layers which are built on one another in succession. At the same time, various technologies which can form a plurality of thin cross-sectional layers are carried out progressively. For instance, the thin cross-sectional layers may be formed, wherein a printing module of a printing apparatus usually can be moved along the X-Y plane above a base in the XYZ coordinate system which is constructed according to the virtual design data of the three-dimensional model, so as to extrude or deposit material in correct shape of the cross-sectional layer. The deposited material may then harden naturally or be cured by, for example, powerful light source, to form the desired cross-sectional layer. Therefore, by the printing module gradually moves along the Z axis layer by layer, a plurality of cross-sectional layers are stacked gradually along the Z axis, and a 3-D object is formed under the condition of the deposited material further being cured gradually and layer by layer.

Taking the technology of forming a 3-D object by curing the deposited material through light source as an example, a moving stage of the printing apparatus is adapted to be submerged in the liquid forming material which is filled in the tank, and the light source module illuminates the liquid forming material on the X-Y plane, so that the liquid forming material is cured and stacked on the moving stage. As such, by moving the moving stage of the printing apparatus along the Z axis gradually and layer by layer, the liquid forming material may be gradually cured layer by layer and stacked to form the 3-D object. During the forming process of the 3-D object, the printing apparatus usually shields the tank with an outer cover so that the liquid forming material can be cured by the illuminating of the light source of the printing apparatus. However, when a user opens the outer cover and picks up the 3-D object after the 3-D object is completed, the rest of the liquid forming material which has not been cured may be illuminated by the external light source and induce undesired or unexpected solidification. Furthermore, the user may happen to accidently touch the liquid forming material when he/she picks up the 3-D object, or the liquid forming material may spill if the 3-D object accidently falls. Thus, if the liquid forming material is exposed, the operating function of the printing apparatus may be affected.

SUMMARY OF THE INVENTION

The disclosure provides a three-dimensional printing apparatus which may prevent the liquid forming material from being exposed and has an improved operating function.

The three-dimensional printing apparatus of the disclosure includes a chassis, a tank, an outer cover and a shielding module. The tank is disposed at the chassis and adapted to be filled with a liquid forming material. The outer cover has a first side and a second side opposite to each other. The outer cover is pivoted on the chassis through the first side and adapted to rotate relative to the chassis, so that the second side moves relative to the chassis. The shielding module is disposed on the chassis and connected to the outer cover. The shielding module includes a pivot and a mask. The pivot is disposed on the chassis and located beside the tank. The mask winds on the pivot and is connected with the second side of the outer cover, wherein when the outer cover rotates to a first position and covers the tank, the mask is winding on the pivot, and when the outer cover rotates to a second position and exposes the tank, the second side of the outer cover pulls the mask out of the pivot, so that the mask covers the tank in order to shield the liquid forming material filled in the tank.

According to one exemplary embodiment of the disclosure, the tank has a first edge and a second edge opposite to each other, and the first edge is located between the second edge and the first side of the outer cover. The pivot is located at the first edge of the tank, and the mask is adapted to move from the first edge to the second edge and cover the tank.

According to one exemplary embodiment of the disclosure, the shielding module further includes two pulleys and two ropes. The two pulleys are pivoted on the chassis and located at the second edge of the tank. The two ropes are correspondingly disposed around the two pulleys and connected to the mask and the second side of the outer cover. The outer cover is adapted to pull the mask out of the pivot via the two ropes, and the mask moves from the first edge to the second edge.

According to one exemplary embodiment of the disclosure, the shielding module further includes a restoration component which is disposed on the pivot and connected to the mask. When the outer cover rotates to the second position, the outer cover pulls the mask out of the pivot and the restoration component stores a potential energy, and when the outer cover rotates to the first position, the restoration component drives the mask to be wound on the pivot via the potential energy.

According to one exemplary embodiment of the disclosure, a rotating axis of the outer cover and a moving axis of the mask are perpendicular to each other.

According to one exemplary embodiment of the disclosure, the rotating axis of the outer cover and a rotating axis of the pivot are parallel to each other, and the outer cover and the pivot are adapted to rotate along a same clockwise direction.

According to one exemplary embodiment of the disclosure, the three-dimensional printing apparatus further includes a moving stage, a light source and a control unit. The moving stage is disposed above the tank and adapted to move into or move out of the liquid forming material. The light source is disposed at a side of the tank and adapted to illuminate the liquid forming material. The control unit is electrically connected to the light source and the moving stage, wherein after the outer cover rotates to the first position, the mask is wound on the pivot and exposes the tank, the control unit controls the moving stage to move within the liquid forming material, and controls the light source to illuminate the liquid forming material, so as to subsequently cure the illuminated liquid forming material layer by layer and form a three-dimensional object on the moving stage, and after the control unit controls the moving stage to move out of the liquid forming material, the outer cover rotates to the second position so as to expose the moving stage and the three-dimensional object.

According to one exemplary embodiment of the disclosure, the light source is disposed above the tank. During the process of the light source illuminating the liquid forming material, the moving stage moves within the liquid forming material toward a direction distant from the light source and gradually near to the bottom portion of the tank.

According to one exemplary embodiment of the disclosure, the light source is disposed below the tank. During the process of the light source illuminating the liquid forming material, the moving stage moves within the liquid forming material toward a direction distant from the light source and gradually near to the top portion of the tank.

According to one exemplary embodiment of the disclosure, the liquid forming material includes a photosensitive resin.

In light of the above, in the three-dimensional printing apparatus of the disclosure, during the process of the three-dimensional object being formed by the liquid forming material, the outer cover covers the tank and the moving stage. When the outer cover exposes the moving stage through rotating, the outer cover simultaneously drives the shielding module to cover the tank, so as to shield the liquid forming material filled in the tank. As such, the liquid forming material is shielded by the outer cover or the shielding module. Therefore, the liquid forming material may not be illuminated by the external light source and may not induce unexpected solidification, and the user may not accidentally touch the liquid forming material during the process of operating the three-dimensional printing apparatus. Accordingly, the three-dimensional printing apparatus of the disclosure may prevent the liquid forming material from being exposed and has an improved operating function.

To make the above features and advantages of the present invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
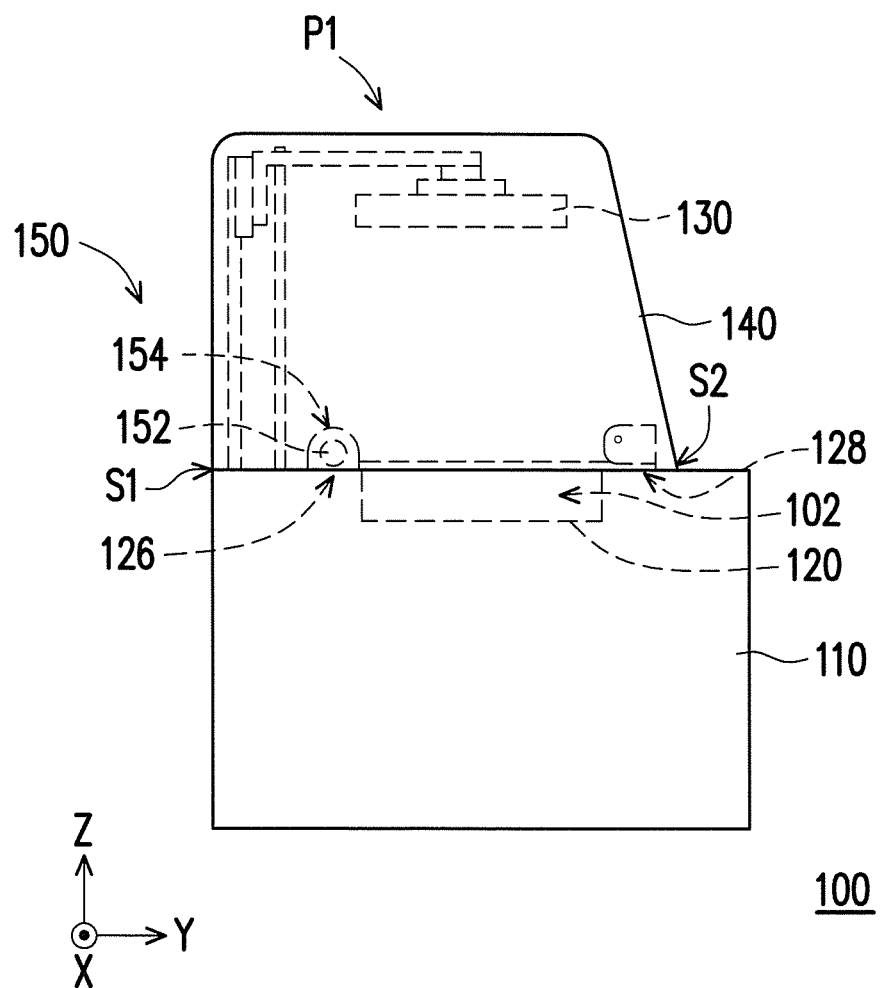
FIG. 1 is a schematic side view of a three-dimensional printing apparatus according to one exemplary embodiment of the disclosure.
Figure 2:
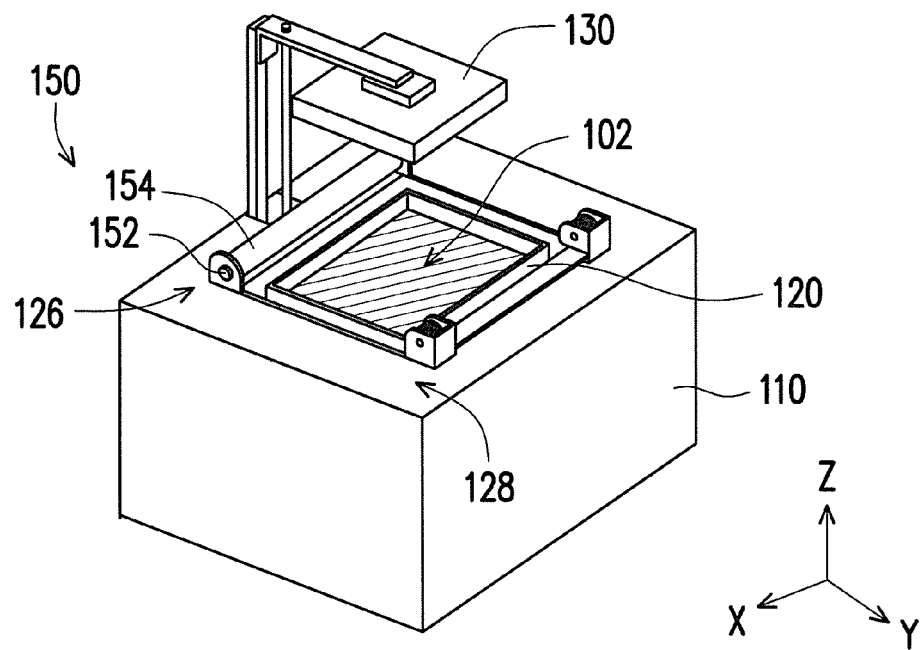
FIG. 2 is a perspective view of a portion of the three-dimensional printing apparatus of FIG. 1.
Figure 5:
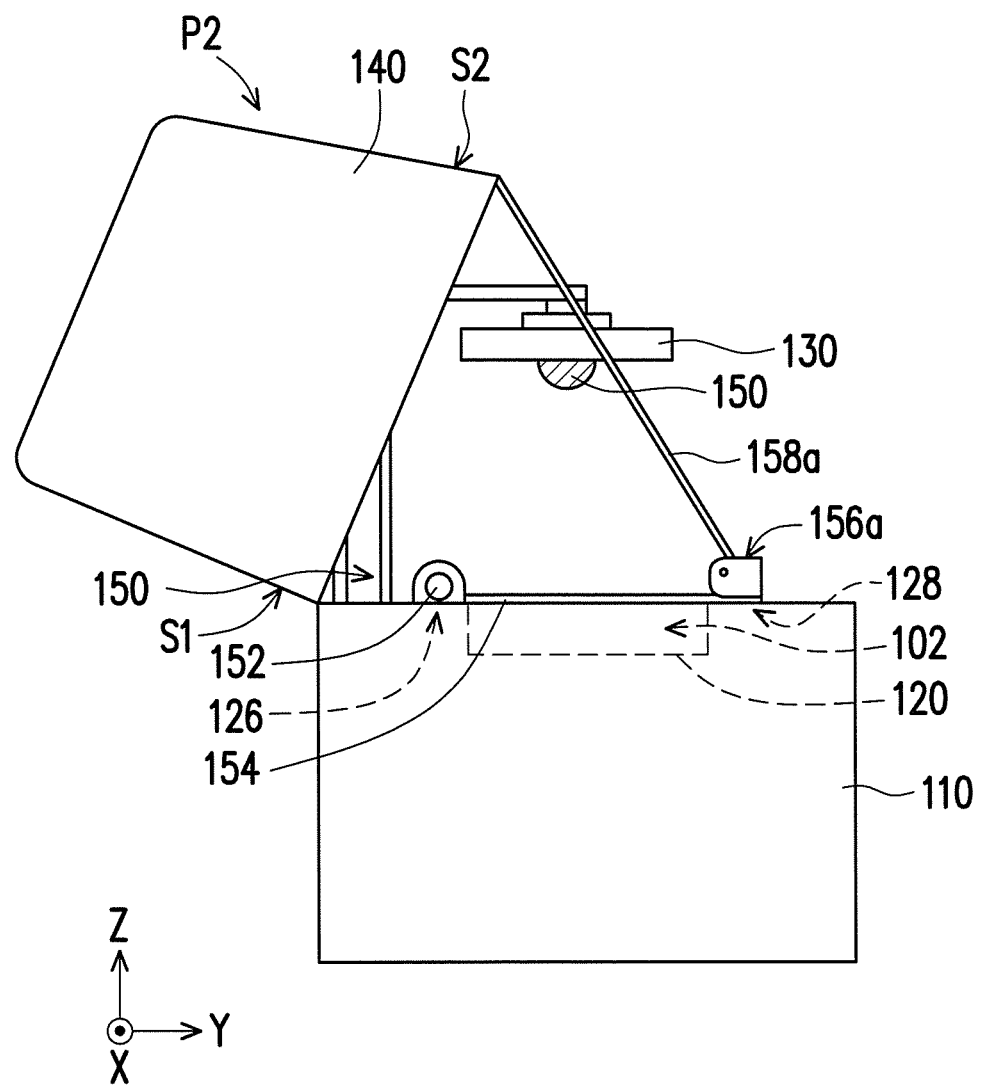
FIG. 5 is a schematic side view of the three-dimensional printing apparatus of FIG. 1 in another status.
Figure 6:
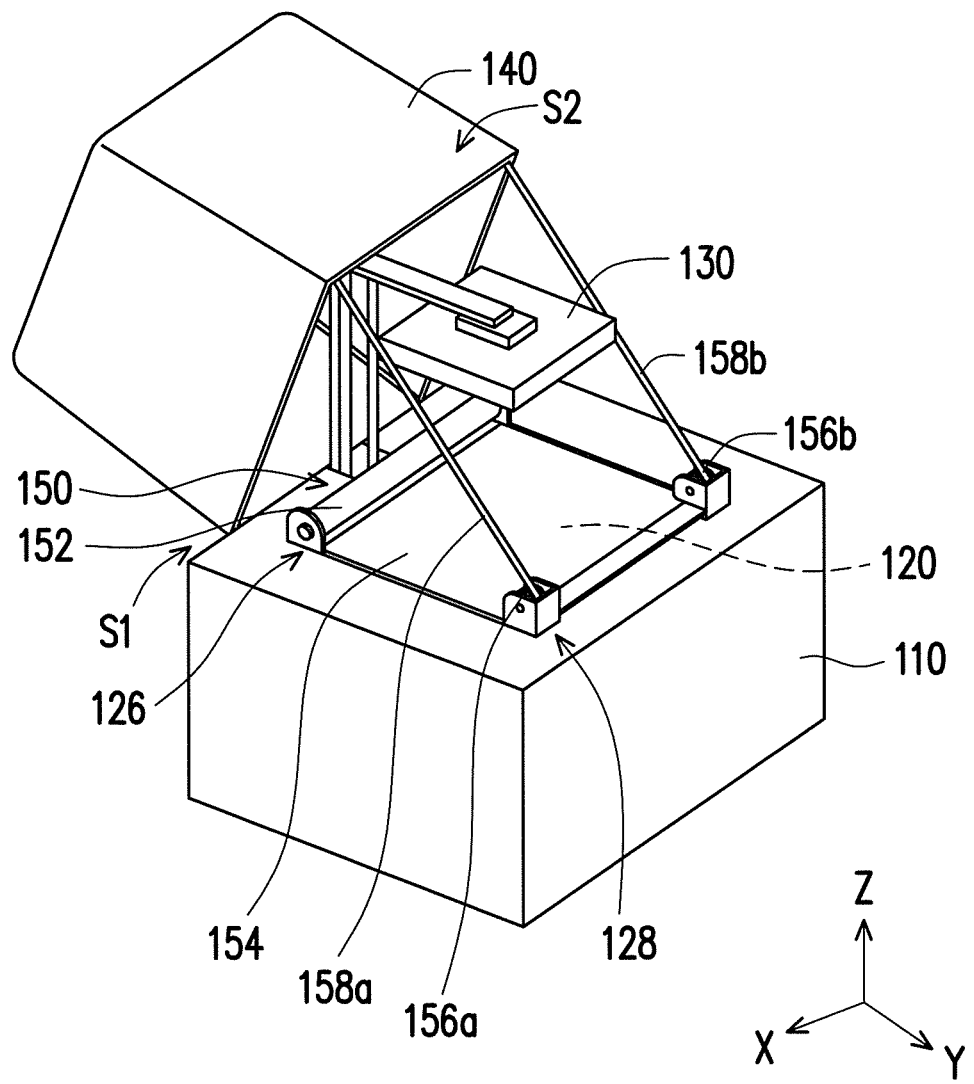
FIG. 6 is a perspective view of a portion of the three-dimensional printing apparatus of FIG. 5.

FIG. 1 is a schematic side view of a three-dimensional printing apparatus according to one exemplary embodiment of the disclosure. FIG. 2 is a perspective view of a portion of the three-dimensional printing apparatus of FIG. 1. For the sake of clearness of the drawing, FIG. 2 omits the outer cover 140 shown in FIG. 1. Referring to FIG. 1 and FIG. 2, the three-dimensional (3-D) printing apparatus 100 includes a chassis 110, a tank 120, a moving stage 130, an outer cover 140 and a shielding module 150. The tank 120 is disposed at the chassis 110 and adapted to be filled with a liquid forming material 102. The liquid forming material 102 is a photosensitive resin, for example, and is adapted to be cured by light and forms a 3-D object 50 (shown in FIG. 3). The moving stage 130 is disposed above the tank 120 and adapted to moves relative to the tank 120, so as to move into or move out of the liquid forming material 102. The outer cover 140 has a first side S1 and a second side S2 opposite to each other. The outer cover 140 is pivoted on the chassis 110 through the first side S1 and adapted to rotate relative to the chassis 110, so that the second side S2 moves relative to the chassis 110, as shown in FIG. 5 and FIG. 6. The shielding module 150 is disposed on the chassis 110 and connected to the outer cover 140. The 3-D printing apparatus 100 is adapted to manufacture a 3-D object 50 (shown in FIG. 3) according to a 3-D model (not shown), wherein the 3-D model may be constructed through computer-aided design (CAD) or an animation modeling software, and the 3-D model is horizontally sliced to a plurality of cross-sections. The 3-D printing apparatus 100 reads the 3-D model, and then cures the liquid forming material 102 to form the 3-D object 50 according to the cross-sections of the 3-D model. Exemplary embodiment of operating process of the 3-D printing apparatus 100 is illustrated in the following context accompanied with figures.

Specifically, referring to FIG. 1 and FIG. 2 first, in the embodiment, the 3-D printing apparatus 100 is illustrated with the XYZ coordinate system, the chassis 110 may be deemed disposed on the X-Y plane, and the tank 120 and the liquid forming material 102 filled in the tank 120 may be deemed located on the X-Y plane. The moving stage 130 is positioned above the tank 120 and adapted to moves along a moving axis (e.g., the Z axis) relative to the tank 110 which is located on the X-Y plane. The outer cover 140 is adapted to rotate along a rotating axis (e.g., the X axis) and located at a first position P1, as shown in FIG. 1. When the outer cover 140 is located at the first position P1, the outer cover 140 may be deemed that it is in a closed status and covers the tank 120 and the moving stage 130. In other words, when the outer cover 140 is located at the first position P1, both of the tank 120 and the moving stage 130 are located inside the outer cover 140. In addition, the outer cover 140 and the chassis 110 form a closed space. As such, the outer cover 140 located at the first position P1 may prevent the components located inside the outer cover 140 from being illuminated by an external light source (not shown), e.g., light for illumination, located outside the 3-D printing apparatus 100. On the other hand, when the outer cover 140 is located at the first position P1 and covers the tank 120 and the moving stage 130, the shielding module 150 does not cover the tank 120, namely the shielding module 150 exposes the tank 120 at this time. At this moment, the opening of the tank 120 is located within the closed space, so that the liquid forming material 102 within the tank 120 is exposed to the closed space through the opening. As such, after the outer cover 140 covers the tank 120 and the moving stage 130, the moving stage 130 is adapted to move along the Z axis through the opening of the tank 120, move into the liquid forming material 102 filled in the tank 120, and form a 3-D object 50 (shown in FIG. 3) through the liquid forming material 102.

Figure 3:
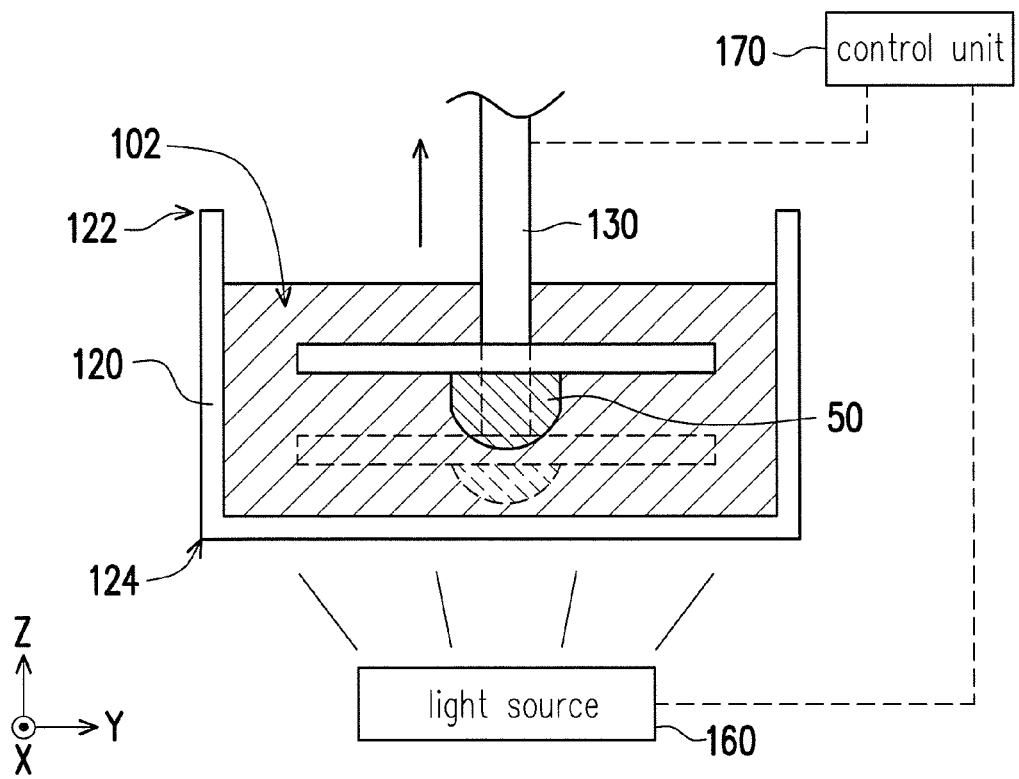
FIG. 3 is a schematic view of a portion of the three-dimensional printing apparatus of FIG. 1.

More specifically, referring to FIG. 1 through FIG. 3, wherein FIG. 3 is a schematic view of a portion of the three-dimensional printing apparatus of FIG. 1 and omits some components of FIG. 1 for the sake of clearness of the drawing. In the embodiment, the 3-D printing apparatus 100 further includes a light source 160 and a control unit 170. The light source 160 is disposed at a side of the tank 120, for example, disposed below the tank 120, and adapted to illuminate the liquid forming material 102. The control unit 170 is electrically connected to the light source 160 and the moving stage 130, and used for controlling the light source 160 and the moving stage 130. After the outer cover 140 rotates to the first position P1, the control unit 170 is adapted to control the moving stage 130 to move along the Z axis toward the tank 120 and be submerged in the liquid forming material 102. Since the liquid forming material 102 of the embodiment utilizes a photosensitive resin or other suitable light curable material, the liquid forming material 102 is solidified after illuminated by the light source 160. As such, after the control unit 170 controls the moving stage 130 to be submerged in the liquid forming material 102, the control unit 170 may control the moving stage 130 to move gradually along the Z axis within the liquid forming material 102, and control the light source 160 to illuminate the liquid forming material 102, so as to cure the illuminated liquid forming material 102 layer by layer to form a 3-D object 50 on the moving stage 130. In other words, whenever the moving stage 130 moves to a position of the Z axis, the light source 160 illuminates and cures the portion of the liquid forming material 102 which is located at that position. On the other hand, since the light source 160 of the embodiment is disposed below the tank 120, during the process of the light source 160 illuminating the liquid forming material 102, the moving stage 130 moves within the liquid forming material 102 toward a direction distant from the light source 160 and gradually near to a top portion 122 of the tank 120, as shown by the arrow in FIG. 3. As such, along with the moving stage 130 gradually moves along the Z axis, the liquid forming material 102 may be gradually cured layer by layer on the moving stage 130, and finally stacked to form the 3-D object 50.

In light of the above, in the 3-D printing apparatus 100 of the embodiment, all the processes that the liquid forming material 102 is illuminated by the light source 160 and stacked layer by layer on the moving stage 130 to form the 3-D object 50 are performed in the closed space formed by the outer cover 140 and the chassis 110. In other words, in the 3-D printing apparatus 100, the process of the 3-D object 50 being formed by curing the liquid forming material 102 is performed under a condition of the outer cover 140 covering the tank 120 and the moving stage 130. As such, during the process of forming the 3-D object, the outer cover 140 may prevent the liquid forming material 102 located within the outer cover 140 from being illuminated by the external light source. Therefore, the liquid forming material 102 may not be illuminated by the external light source, may not induce unexpected solidification and further adhere on the formed 3-D object 50 to cause error to the appearance of the 3-D object. In addition, the photosensitive resin used for the liquid forming material 102 smells strongly. In the forming process of the 3-D object 50, by covering the tank 120 with the outer cover 140, it may be avoided that the smell of the liquid forming material 102 comes out and causes the user uncomfortable. However, the location of the light source 160 is not limited thereto, and another embodiment is illustrated in the following.

Figure 4:
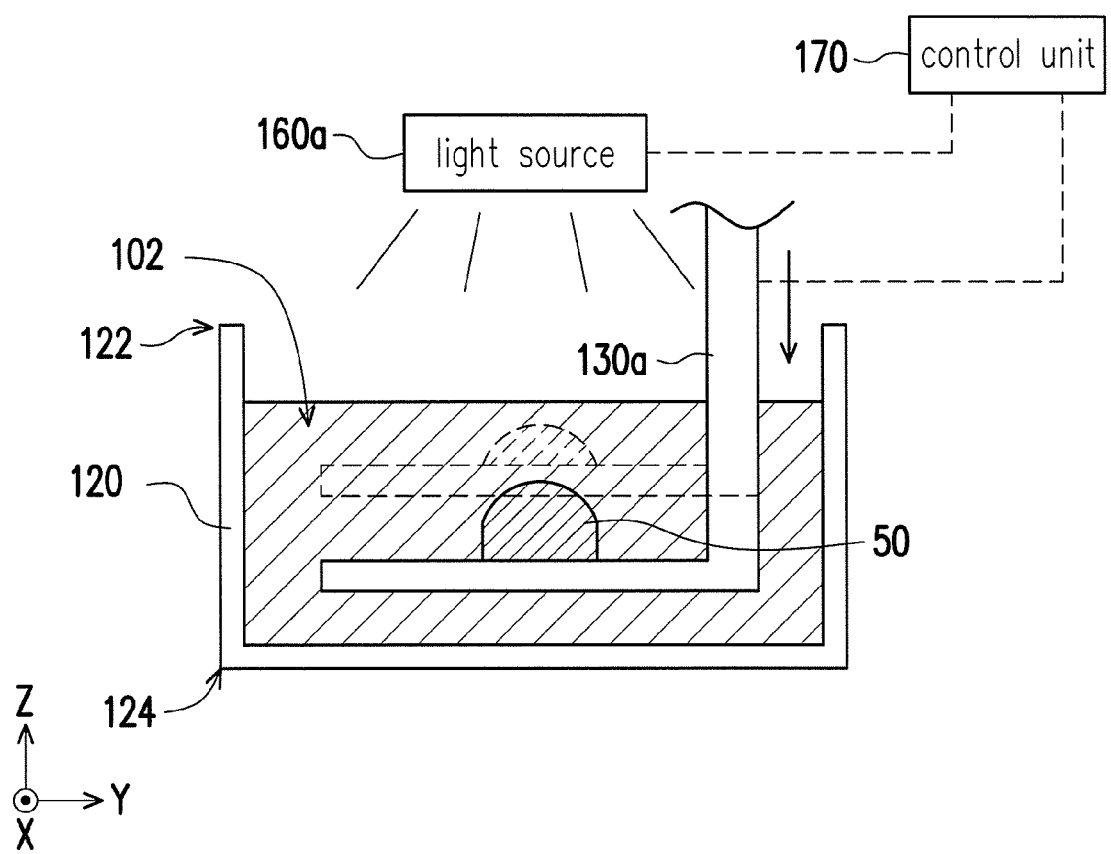
FIG. 4 is a schematic view of a portion of a three-dimensional printing apparatus according to another exemplary embodiment of the disclosure.

FIG. 4 is a schematic view of a portion of a three-dimensional printing apparatus according to another exemplary embodiment of the disclosure, wherein merely the tank 120, a portion of the moving stage 130a, the light source 160a and the control unit 170 are shown in FIG. 4 for the sake of clearness of the drawing. Referring to FIG. 1 and FIG. 4, in the embodiment, the light source 160a is disposed above the tank 120, the moving path of the moving stage 130a which is also disposed above the tank 120 does not interfere the light source 160a illuminating the liquid forming material 102. The difference between the present embodiment and the abovementioned embodiment is that, during the process of the light source 160a illuminating the liquid forming material 102, the moving stage 130a moves within the liquid forming material 102 toward a direction distant from the light source 160a and gradually near to a bottom portion 124 of the tank 120, as shown by the arrow in FIG. 4. As such, along with the moving stage 130a gradually moves along the Z axis layer by layer, the liquid forming material 102 may be gradually cured layer by layer on the moving stage 130a, and finally stacked to form the 3-D object 50. It can be known that, the location of the light source 160 and 160a is not limited thereto and may be adjusted as required.

FIG. 5 is a schematic side view of the three-dimensional printing apparatus of FIG. 1 in another status. FIG. 6 is a perspective view of a portion of the three-dimensional printing apparatus of FIG. 5. Referring to FIG. 1, FIG. 2, FIG. 5 and FIG. 6, in the embodiment, after the 3-D printing apparatus 100 forms the 3-D object 50 by the abovementioned ways, the control unit 170 (shown in FIG. 3) controls the light source 160 to stop illuminating the liquid forming material 102 and controls the moving stage 130 to move along the Z axis to move out of the liquid forming material 102, and the 3-D object 50 is also moved out along with the moving stage 130 moving out of the liquid forming material 102. In order to pick up the formed 3-D object 50, after the control unit 170 controls the moving stage 130 to move out of the liquid forming material 102, the outer cover 140 is needed to be opened so that the moving stage 130 and the 3-D object 50 may be exposed. Therefore, the outer cover 140 located at the first position P1 is adapted to rotate along the rotating axis (e.g., the X axis) and located at a second position P2, as shown in FIG. 5 and FIG. 6. When the outer cover 140 is located at the second position P2, the outer cover 140 may be deemed that it is in an open status and exposes the moving stage 130 and the 3-D object 50. As such, the user may pick up the 3-D object 50 from the moving stage 130. On the other hand, when the outer cover 140 is located at the second position P2 and exposes the moving stage 130 and the 3-D object 50, the outer cover 140 drives the shielding module 150 to cover the tank 120, so as to shield the liquid forming material 102 filled in the tank 120. Thus, even though the outer cover 140 is in an open status, the liquid forming material 102 may be shielded by the shielding module 150 and prevented from being exposed.

Specifically, please refer to FIG. 1, FIG. 2, FIG. 5 and FIG. 6, in the embodiment, the shielding module 150 includes a pivot 152 and a mask 154. The pivot 152 is pivoted on the chassis 110 and located beside the tank 120. The mask 154 winds on the pivot 152 and connected to the second side S2 of the outer cover 140. When the outer cover 140 rotates to the first position P1, the mask 154 is wound on the pivot 152 and exposes the tank 120, as shown in FIG. 1 and FIG. 2. When the outer cover 140 rotates to the second position P2 and exposes the tank 120, the second side S2 of the outer cover 140 may pull the mask 154 out of the pivot 152, such that the mask 154 covers the tank 120 in order to shield the liquid forming material 102 filled in the tank 120, as shown in FIG. 5 and FIG. 6.

Additionally, the tank 120 has a first edge 126 and a second edge 128 opposite to each other, and the first edge 126 is located between the second edge 128 and the first side S1 of the outer cover 140. The pivot 152 is located at the first edge 126 of the tank 120, and the mask 154 is adapted to move from the first edge 126 to the second edge 128 of the tank 120 and cover the tank 120. In order to realize the abovementioned action, the shielding module 150 of the embodiment further includes two pulleys 156a and 156b and two ropes 158a and 158b. The two pulleys 156a and 156b are pivoted on the chassis 110 and located at the second edge 128 of the tank 120. In other words, the pivot 152 and the two pulleys 156a and 156b are respectively disposed on the two opposite edges (the first edge 126 and the second edge 128) of the tank 120, and the two pulleys 156a and 156b located at the same edge (the second edge 128) are respectively near to the two adjacent corners of the tank 120. The two ropes 158a and 158b correspondingly wind on the two pulleys 156a and 156b and are connected to the mask 154 and the second side S2 of the outer cover 140. When the outer cover 140 rotates to the first position P1, the mask 154 is wound on the pivot 152 and exposes the tank 120, and the two ropes 158a and 158b are respectively located at the two opposite edges of the tank 120, so as to avoid the interfering the moving of the moving stage 130 and to prevent the forming of the 3-D object 50 being affected. When the outer cover 140 rotates from the first position P1 to the second position P2, the outer cover 140 pulls the two ropes 158a and 158b through rotating via the second side S2, so that the mask 154 is pulled out of the pivot 152 through the two ropes 158a and 158b, and the mask 154 moves from the first edge 126 to the second edge 128. Accordingly, when the outer cover 140 rotates to the second position P2 and exposes the moving stage 130 and the 3-D object 50, the mask 154 of the shielding module 150 may cover the tank 120 by the driving of the outer cover 140 and the two ropes 158a and 158b, and further shield the liquid forming material 102 filled in the tank 120, and the process is as shown in FIG. 1 and FIG. 5, or FIG. 2 and FIG. 6.

Additionally, in the embodiment, the shielding module 150 may further include a restoration component which is not shown in the drawings. The restoration component is disposed on the pivot 152 and connected to the mask 154. When the outer cover 140 rotates to the second position P2, the outer cover 140 pulls the mask 154 out of the pivot 152 and the restoration component stores a potential energy since the two ends thereof is compressed or tensioned through the relative movement of the mask 154 and the pivot 152. When the outer cover 140 rotates to the first position P1, the restoration component releases the potential energy and drives the mask 154 to be automatically wound on the pivot 152 via the potential energy. As such, the mask 154 covers the tank 120 through the driving of the outer cover 140 and the two ropes 158a and 158b, and is automatically wound on the pivot 152 via the restoration component and exposes the tank 120, so that the operating of the shielding module 150 may become easier.

Referring to FIG. 1, FIG. 2, FIG. 5 and FIG. 6, in the embodiment, the rotating axis of the outer cover 140 and the rotating axis of the pivot 152 are parallel to each other, and the outer cover 140 and the pivot 152 are adapted to rotate along a same clockwise direction. Specifically, as mentioned above, the outer cover 140 is adapted to rotate along the X axis, thus the outer cover 140 may be deemed to take the X axis as the rotating axis. Since the outer cover 140 drives the mask 154 to cover the tank 120 through the two ropes 158a and 158b, the pivot 152 which is driven by the mask 154 to rotate is also adapted to rotate along the X axis. In other words, the pivot 152 may also be deemed to take the X axis as the rotating axis, such that the rotating axis of the outer cover 140 and the rotating axis of the pivot 152 are parallel to each other. Moreover, for example, when the outer cover 140 rotates from the first position P1 to the second position P2 along a counter clockwise direction, the mask 154 may be driven by the outer cover 140 and moves from the pivot 152 to the adjacent two pulleys 156a and 156b, and the pivot 152 is driven by the outer cover 140 and rotates along the counter clockwise direction. When the outer cover 140 rotates from the second position P2 to the first position P1 along the clockwise direction, the pivot 152 is driven by the restoration component and rotates along the clockwise direction, so that the mask 154 is wound thereon. In addition, since the mask 154 is driven by the outer cover 140 and covers the tank 120, when the outer cover 140 rotates to the second position P2 along the X axis, the outer cover 140 drives the mask 154 to move along the Y axis. More specifically, the outer cover 140 drives the mask 154 to move along the X-Y plane so as to cover the tank 120 which is located on the X-Y plane. As such, in the embodiment, the rotating axis (X axis) of the outer cover 140, the moving axis (Y axis) of the mask 154 and the moving axis (Z axis) of the moving stage 130 are perpendicular to one another. However, the abovementioned only represents an embodiment of the disclosure. The disclosure is not limited thereto.

Accordingly, after the 3-D printing apparatus 100 of the embodiment completes forming the 3-D object 50, the outer cover 140 may be opened and the 3-D object 50 may be picked up. At the same time, the shielding module 150 is driven by the outer cover 140 to cover the tank 120, so as to shield the liquid forming material 102 filled in the tank 120. In other words, in the condition of the outer cover 140 is in an open status, the shielding module 150 may prevent the external light source located outside the 3-D printing apparatus 100 illuminating the liquid forming material 102, in order to avoid that the rest of the liquid forming material 102 is illuminated by the external light source and caused unexpected solidification. Therefore, the rest of the liquid forming material 102 may be maintained in the original status, and used in the next forming process. In addition, as mentioned above, the photosensitive resin used for the liquid forming material 102 smells strongly. When the outer cover 140 is in the open status, the shielding module 150 covers the tank 120, and similarly it may be avoided that the smell of the liquid forming material 102 comes out and causes the user uncomfortable. Furthermore, when the user picks up the 3-D object 50, the liquid forming material 150 is shielded by the shielding module 150, thus even though the 3-D object 50 accidentally falls, it may only fall on the shielding module 150. As such, the 3-D object 50 may be prevented from falling into the tank 120 and causing the liquid forming material 102 to spill on the user.

In light of the foregoing, in the 3-D printing apparatus of the disclosure, the liquid forming material is illuminated by the light source and stacked layer by layer to form the 3-D object on the moving stage, and the outer cover covers the tank and the moving stage in the process of forming the 3-D object. In addition, after the 3-D object is completed, the outer cover exposes the moving stage through rotating, and the outer cover simultaneously drives the shielding module to cover the tank, so as to shield the liquid forming material filled in the tank. As such, the liquid forming material is shielded by the outer cover or the shielding module, thus the liquid forming material is not exposed during the operating process of the 3-D printing apparatus. As such, the liquid forming material may not illuminated by the external light source and cause unexpected solidification. Furthermore, during the operating process of the 3-D printing apparatus, the user may not accidentally touch the liquid forming material filled in the tank and the smell of the liquid forming material may not come out and cause the user uncomfortable. Accordingly, the 3-D printing apparatus of the disclosure may prevent the liquid forming material from being exposed and has an improved operating function.

Although the present invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. A three-dimensional printing apparatus, comprising:
    a chassis;
    a tank, disposed at the chassis and adapted to be filled with a liquid forming material;
    an outer cover, having a first side and a second side opposite to each other, wherein the outer cover is pivoted on the chassis through the first side and adapted to rotate relative to the chassis, so that the second side moves relative to the chassis; and
    a shielding module, disposed on the chassis and connected to the outer cover, the shielding module comprising:
        a pivot, disposed on the chassis and beside the tank; and
        a mask, winding on the pivot and connected with the second side, wherein when the outer cover rotates to a first position, the mask is winding on the pivot, and when the outer cover rotates to a second position, the second side of the outer cover pulls the mask out of the pivot, so that the mask covers the tank in order to shield the liquid forming material filled in the tank.

2. The three-dimensional printing apparatus as claimed in claim 1, wherein the tank has a first edge and a second edge opposite to each other, the first edge is located between the second edge and the first side of the outer cover, the pivot is located at the first edge of the tank, and the mask is adapted to move from the first edge to the second edge and cover the tank.

3. The three-dimensional printing apparatus as claimed in claim 2, wherein the shielding module further comprises two pulleys and two ropes, wherein the two pulleys are pivoted on the chassis and located at the second edge of the tank, the two ropes are correspondingly disposed around the two pulleys and connected to the mask and the second side of the outer cover, the outer cover is adapted to pull the mask out of the pivot via the two ropes, and the mask moves from the first edge to the second edge.

4. The three-dimensional printing apparatus as claimed in claim 2, wherein the shielding module further comprises a restoration component disposed on the pivot and connected to the mask, when the outer cover rotates to the second position, the outer cover pulls the mask out of the pivot and the restoration component stores a potential energy, and when the outer cover rotates to the first position, the restoration component drives the mask to be wound on the pivot via the potential energy.

5. The three-dimensional printing apparatus as claimed in claim 1, wherein a rotating axis of the outer cover and a moving axis of the mask are perpendicular to each other.

6. The three-dimensional printing apparatus as claimed in claim 5, wherein the rotating axis of the outer cover and a rotating axis of the pivot are parallel to each other, and the outer cover and the pivot are adapted to rotate along a same clockwise direction.

7. The three-dimensional printing apparatus as claimed in claim 1, further comprising:
    a moving stage, disposed above the tank and adapted to move into or move out of the liquid forming material;
    a light source, disposed at a side of the tank and adapted to illuminate the liquid forming material; and
    a control unit, electrically connected to the light source and the moving stage, wherein after the outer cover rotates to the first position, the mask is wound on the pivot and exposes the tank, the control unit controls the moving stage to move within the liquid forming material, and controls the light source to illuminate the liquid forming material, so as to subsequently cure the illuminated liquid forming material layer by layer and form a three-dimensional object on the moving stage, and after the control unit controls the moving stage to move out of the liquid forming material, the outer cover rotates to the second position so as to expose the moving stage and the three-dimensional object.

8. The three-dimensional printing apparatus as claimed in claim 7, wherein the light source is disposed above the tank, during a process of the light source illuminating the liquid forming material, the moving stage moves within the liquid forming material toward a direction distant from the light source and gradually near to a bottom portion of the tank.

9. The three-dimensional printing apparatus as claimed in claim 7, wherein the light source is disposed below the tank, during a process of the light source illuminating the liquid forming material, the moving stage moves within the liquid forming material toward a direction distant from the light source and gradually near to a top portion of the tank.

10. The three-dimensional printing apparatus as claimed in claim 1, wherein the liquid forming material comprises a photosensitive resin.

* * * * *